May 5, 1964
G. W. CORNELL
3,131,441
WEATHER STRIP
Filed May 18, 1961
2 Sheets-Sheet 1
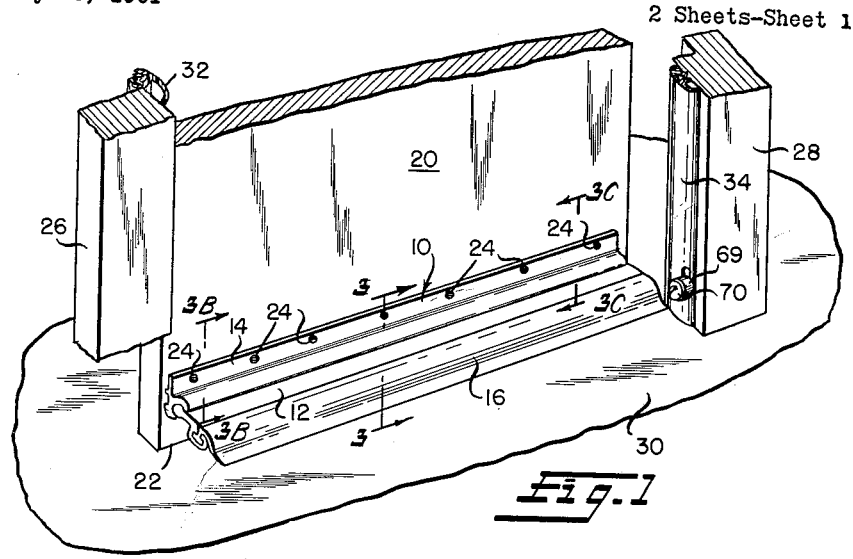
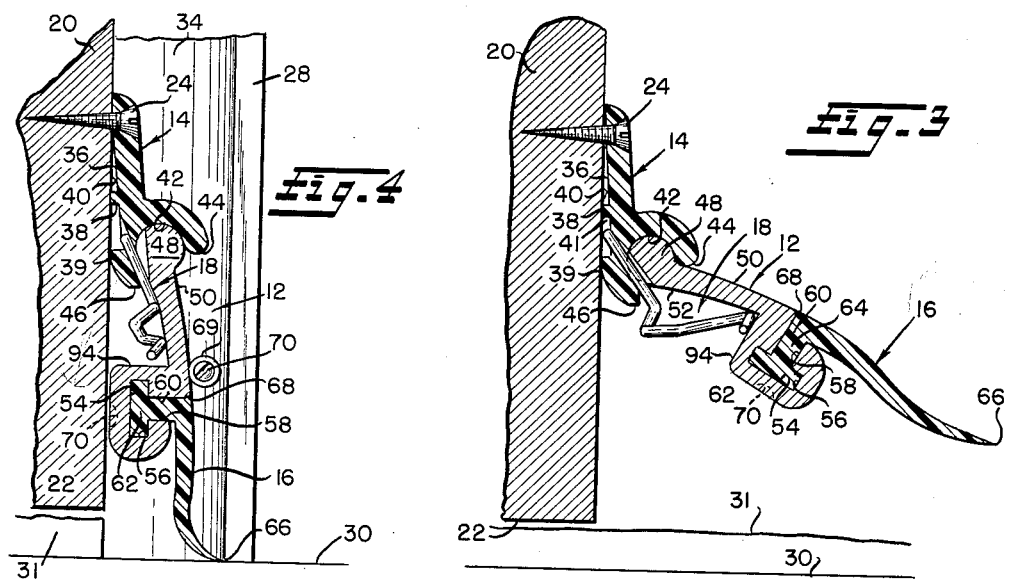
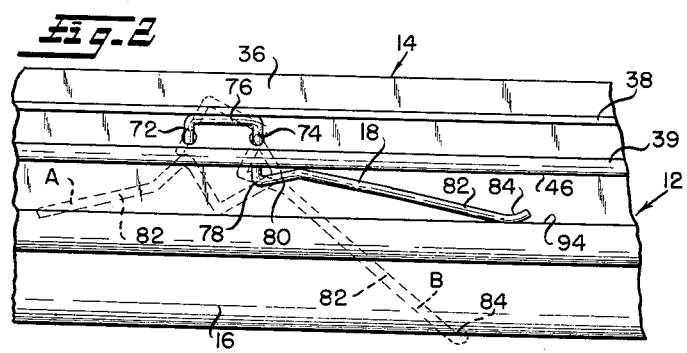
INVENTOR
George W. Cornell
ATTORNEYS May 5, 1964    G. W. CORNELL    3,131,441
WEATHER STRIP
Filed May 18, 1961    2 Sheets-Sheet 2
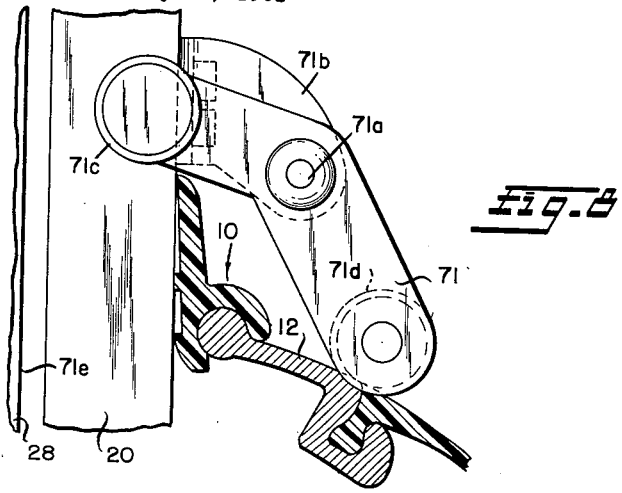
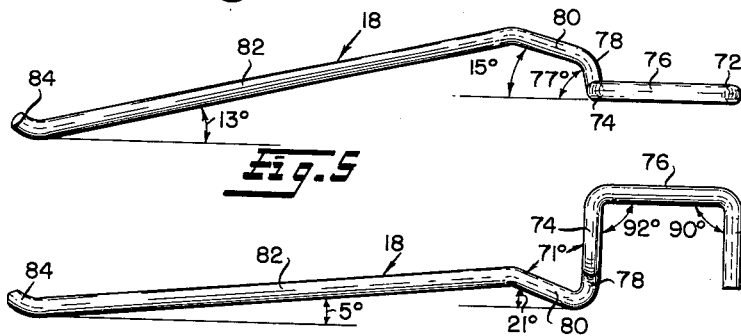
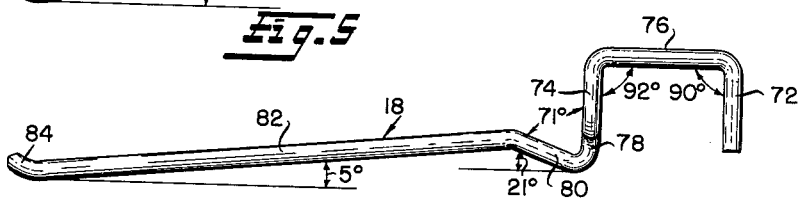
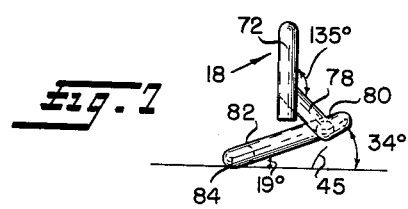
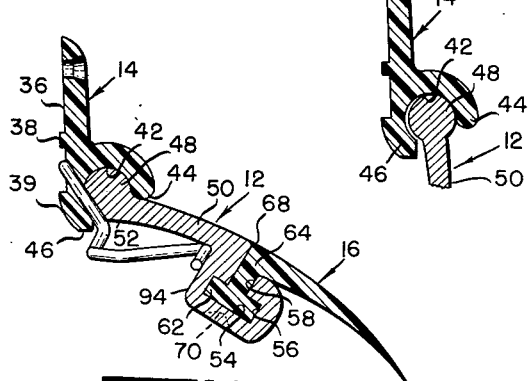
INVENTOR
George W. Cornell
BY
*Strauch, Nolan + Neale*
ATTORNEYS

United States Patent Office 3,131,441
Patented May 5, 1964

3,131,441
WEATHER STRIP
George W. Cornell, 7310 SW. 47th Court, Miami 42,
Fla., assignor of one-half to W. Elder Cornell, Jr.,
Miami, Fla.
Filed May 18, 1961, Ser. No. 111,007
3 Claims. (Cl. 20—67)

The present invention relates to weather strips for hinged doors, windows or the like and more particularly to door, window, or like closure mounted weather strips which are of the spring biased pivotally mounted type.

Weather strips of this general type embody a rigid mounting member or strip fixed to and extending along the exterior face adjacent the bottom of the closure member, a rigid seal support member or strip pivotally supported upon the attachment strip and extending coextensively therewith in a normally spring biased non-sealing position, and a flexible, usually elastomeric, seal strip carried by and projecting from the support member for sealing engagement with the threshold when the closure member is in closed position. To effect an efficient seal when the door is closed, the pivoted support strip must be sealed to both the flexible strip and the mounting strip which in turn must be sealed to the door and the flexible strip must have an extremely flexible free edge which will form a seal with the threshold despite any small particles of dirt which may be resting thereon or any irregularties or imperfections in the threshold surface. In addition, since the strips normally mounted on the exterior of the closure where it is exposed to rain, snow, ice, etc., the pivot connections between the support and mounting strip must be non-galling and corrosion free to assure free swinging movements throughout a relatively long period of time to provide a reasonably useful life. The known prior art pivoted weather strips have not effectively achieved these results. They have either had loosely interfitting members which are noisy in operation and do not provide an effective seal or are subject to sticking due to corrosion, galling and dirt accumulation.

It is, therefore, the primary object of this invention to provide an improved spring biased, pivoted weather strip which will provide an effective, long life weather tight seal between a hinged closure and a cooperating threshold.

More specifically, it is an object of this invention to provide a pivoted weather strip embodying a rigid support strip pivotally interconnected by a self-lubricated pivot along one longitudinal edge to a rigid mounting strip and fixedly carrying a flexible sealing strip along its opposite side edge in which the sealing strip and the mounting strip cooperate with the support strip when the unit is in sealing position to form a positive seal with the support strip and cooperate with the threshold and closure member respectively to form weather tight seals therewith.

Still more specifically, further important objects of this invention are to provide a weather strip assembly of the above described type which:

a. Embodies a non-galling, corrosion free self-lubricating pivot connection,
b. Is structurally simple,
c. Is economical to fabricate,
d. Is easy to assemble and install and easy to repair if necessary, and
e. Durable.

These and other objects of the present invention will become more fully apparent by reference to the appended claims and as the following detailed description proceeds in reference to the accompanying drawings wherein:

FIGURE 1 is a fragmentary perspective view of a hinged door and cooperating threshold showing the weather strip of the present invention mounted adjacent the bottom of the door which is illustrated in its partially open non-sealing position;

FIGURE 2 is an elevational view of the rear side of the weather strip shown in FIGURE 1 as it appears prior to mounting upon the door and illustrating in dotted lines the several steps involved in the installation of the biasing spring thereof;

FIGURE 3 is a fragmentary sectional view taken substantially along the line 3—3 of FIGURE 1 showing the configuration of the sealing strip when the door is first opened;

FIGURE 3A is a view similar to FIGURE 3 showing the configuration of the sealing strip when it is first installed or after the door has been left open for a substantial period of time;

FIGURE 3B is a fragmentary sectional view taken along the line 3B—3B of FIGURE 1 when the door is closed;

FIGURE 3C is a fragmentary sectional view taken along the line 3C—3C of FIGURE 1 when the door is closed;

FIGURE 4 is a view similar to FIGURE 3 illustrating the configuration of the weather strip when moved to its sealing position upon closing of the door;

FIGURE 5 is a top plan view of the biasing spring of the weather strip of FIGURE 1;

FIGURE 6 is a side elevational view of the biasing spring of FIGURE 5;

FIGURE 7 is an end view of the biasing spring of FIGURES 5 and 6; and

FIGURE 8 is a fragmentary view of the lower free end of a door equipped with a weather strip in accord with the present invention mounted on its interior face and constituting a second embodiment of the invention.

Referring now in detail to the drawings and particularly to FIGURE 1, the weather strip 10 of the present invention comprises a rigid support strip 12 pivotally mounted upon a mounting strip 14 and carrying a flexible sealing strip 16 and a spring 18 (FIGURE 3) biasing support strip 12 toward its upward or open limit of pivotal movement as shown in FIGURES 1 and 3.

The mounting strip 14 is longitudinally elongated and extends substantially the entire width of the door 20 adjacent its bottom edge 22 as shown in FIGURE 1, being secured thereto by mounting screws 24. The door 20 is pivotally mounted along its left edge by hinges (not shown) upon the jamb member 26 for swinging movement toward and from the opening defined by jamb member 26 and opposing jamb member 28 over the flooring surface 30 providing the threshold between jamb members 28 and 26 and carpet or rug 31 (see FIGURES 3 and 4) when so covered. The door 20 seals in weather tight relation against the jamb members 26 and 28 by engaging the weather strip assemblies 32 and 34 which are of the type disclosed in co-pending application Serial No. 668,475 filed June 27, 1957 by G. W. Cornell for "All Vinyl Door Window or Like Seal Assembly." Reference is made to said application insofar as further details of the construction of the strips 32 and 34 may be found to be desirable to an understanding of the present invention.

Referring now to FIGURE 3, the mounting strip 14, which is an extrusion preferably formed of a rigid polyvinyl chloride or equivalent non-metallic, corrosion-resistant, mildly deformable material, has a flat rear mounting surface 36 interrupted by longitudinally extending projecting beads 38 and 39. Where the strip 10 may be transported or stored under high temperature conditions, such as in the trunk of a car where it has been found the temperature may reach 212° F. in the sun, it is preferable to form strip 14 of a rigid plastic which will withstand these high temperatures without distortion under the pressure exerted by spring 18 over prolonged periods. The acrylonitrile butadiene styrene copolymer resins such as "Cycolac" and "Kralastic" or the high temperature rigid vinyl materials recently developed by B. F. Goodrich Company are suitable for these purposes. Bead 38 provides a line contact bearing seal against the adjacent surface of the door 20. As a consequence, when mounting strip 14 is in its installed position, surface 36 is inclined to the opposing door surface thereby providing spaces 40 and 41 between the surface 36 and the adjacent surface of the door 20. Space 41 accommodates a portion of spring 18 as will be explained presently. The upper rear corner of surface 36 has line contact with the opposing door surface to provide a second bearing seal between strip 14 and the door. At its lower edge, mounting strip 14 is provided with a longitudinally extending cylindrical socket 42 which is radially open at one side to provide a downward and outwardly facing opening between the edges 44 and 46 thereof. The support strip 12, which is preferably formed by extrusion and of a metallic material, preferably of aluminum, brass or similar non-corrosive metal, is provided along one edge with a cylindrical bead 48 which is complementary in form to the cylindrical socket 42 and which may be inserted longitudinally into the socket 42 to form a closely fitting continuous self-lubricated pivotal connection between the support strip 12 and the mounting strip 14. The above referred to materials for strip 14 provide the self-lubricating properties to this pivotal connection. The spacing between the edges 44 and 46 of the mounting strip 14 is sufficiently small relative to the diameter of the bead 48 as to preclude removal of the bead 48 from the socket 42 other than by relative longitudinal movement of the bead within socket 42. The edges 44 and the spring 18 and edge 46 co-act with the surfaces 50 and 52 respectively of the support strip 12 to define the limits of pivotal movement of the shupport strip 12 relative to the mounting strip 14.

Along its opposite longitudinally extending edge, the support strip 12 is formed with a longitudinally extending socket 54 preferably of key hole configuration having a base portion 56 of substantially rectangular cross section intersected by a throat portion 58 of lesser width than the width of the base portion 56. The sealing strip 16 is of tapered configuration in cross section and has formed along one of its longitudinally extending marginal faces at its thicker edge a laterally projecting portion 60 terminating in a head 62 of a cross section complementary to that of the base portion 56 of the socket 54 and a connector portion 64 of complementary cross section to the cross section to the throat portion 58 of the socket 54. The sealing strip 16 is formed of flexible polyvinyl chloride and, as is clearly shown in FIGURE 3, is of diminishing tapering cross section from its side edge carrying head 62 to its opposite side edge which terminates in an extremely flexible substantial knife edge 66.

Flexible polyvinyl chloride has a good memory characteristic but a much slower recovery time than rubber. As a result, when the door 20 is first opened, the strip 16 will retain its flexed configuration as shown in FIGURE 3 elevating its edge well above the top of any carpet such as 31 that may be provided. After strip 16 has been relieved of stress for a substantial length of time, it will restore to its unflexed, as-extruded form, as shown in FIGURE 3A.

The sealing strip 16 along its opposite edge 68 is formed with a small laterally extending lip overlapping a portion of the support member 12 to form a pressure seal therewith when the strip is in its fully flexed FIGURE 4 position. Preferably the support strip in a wall of socket 54 is deflected inwardly to form an internal protuberance 70 to frictionally grip the seal strip 60 and retain it against relative axial displacement. Alternatively strip 16 can be fixed to strip 12 by cement in socket 54.

As is apparent from FIGURE 4, when the support strip 12 is cammed to its closed position as therein shown and as will be described presently, the surface 52 of the support member 12 is brought into engagement with the spring 18 and forces the spring 18 against the edge 46 of the mounting member 14. When strip 12 is in its FIGURE 4 position under the influence of the force exerted on one end thereof by stop 69, its bead 48 will pivot slightly within socket 42 about the centrally located spring 18 so that bead 48 is in sealing contact with the wall of socket 42 adjacent edge 46 at its end adjacent stop 69 as shown in FIGURE 3C and is in sealing contact with the wall of socket 42 adjacent edge 44 at its end remote from roller 68 as shown in FIGURE 3B to thereby prevent passage of the elements and air between the bead 48 and the socket 42. When the weather strip 10 is properly installed, cammed movement of the support strip 12 from its FIGURE 3 to its FIGURE 4 position will produce flexure of the knife edge 66 of strip 16 to substantially the form illustrated in FIGURE 4. Transverse flexure of strip 16 in this manner will bias the lip at edge 68 into sealing contact with the mating surface of the support member 12 to form a weather tight seal with support strip 12 and prevent entry of water or dirt into and through socket 54. The thin tapered edge 66 of the sealing strip 16, due to its sharply tapered construction and to the high flexibility of flexible polyvinyl chloride and equivalent plastic materials of which it is made, will, when stressed to and for a substantial period of time, retain the position shown in FIGURE 4 to form a weather tight surface seal with the floor 30 at the threshold of the door opening assuring an effective seal despite any small particles of dirt which may be interposed between the strip 16 and the floor 30 or any roughness in the surface of the floor 30 or departures of the floor surface at the threshold 30 from a perfectly planar surface.

When the weather strip 10 is mounted upon the side of the door 20 which engages the jambs 26 and 28 and weather strips 32 and 34 when the door is closed, normally the exterior side of the door, the pivotal motion of the support strip 12 and the sealing strip 16 between its FIGURE 3 and its FIGURE 4 positions is controlled as indicated above by a fixed stop 69 preferably a nylon roller fixed upon a mounting screw 70 (FIGURE 1) secured through strip 34 to the jamb 28 in the path of movement of the weather strip assembly 10 as it approaches its fully closed position in engagement with the weather strip 34. As the door 20 is swung to its closed position, the end of the support strip 12 will engage the stop 69 and be cammed downwardly in response to further closing movement of the door 20 from its FIGURE 3 position to its FIGURE 4 position in opposition to the biasing force of the spring 18.

When the weather strip is mounted on the opposite or interior side of the door 20 as shown in FIGURE 8, a lever 71 is pivotally mounted by a pivot stud 71a on a bracket 71b on the door 20 above strip 10 and provided with oppositely projecting cam members, preferably nylon rollers 71c and 71d, adapted to engage respectively the face 71e of jamb 28 and the support strip 12 to pivot the strip 12 downwardly when the door 20 is closed.

Referring to FIGURES 5–7, the spring 18 is a spring wire having a U-shaped terminal portion at one end comprising a pair of legs 72 and 74 interconnected by a base portion 76 all lying substantially in a common plane as illustrated in FIGURE 5. The spring 18 has a first intermediate portion 78 extending from the leg 74 at an angle of substantially 77° to the plane of such U-shaped portion as viewed in FIGURE 5 and at an angle of substantially 135° thereto as viewed in FIGURE 7. From portion 78 there is a further portion 80 extending at an angle of substantially 15° to plane of such U-shaped portion as viewed in FIGURE 5, at an angle of 71° to the portions 74 and 78 as viewed in FIGURE 6. The included angle between portions 78 and 80 as viewed in FIGURE 7 is approximately 100°. From portion 80 there is a longitudinally elongated portion 82 forming an angle of 13° with the plane of the U-shaped portion as viewed in FIGURE 5, an angle of 154° with the axis of portion 80 as viewed in FIGURE 6, and an angle of 19° with the normal to the plane of the U-shaped portion as viewed in FIGURE 7. Spring wire 18 terminates in an end bearing portion 84.

As is apparent from reference to FIGURES 2 and 3, the mounting strip 14 is provided with a pair of longitudinally spaced transversely aligned apertures 86 and 88 formed through the surface 36 thereof and intersecting the socket 42 and grooves 90 and 92 are formed through the side of the bead 48 of the support strip 12 in alignment with the apertures 86 and 88 respectively. The spring 18 is installed by aligning the apertures 86 and 88 with the grooves 90 and 92, placing the spring in position A (FIGURE 2) and inserting the leg 72 of the spring 18 through the groove 92 and the aperture 88, turning the spring 18 counterclockwise to position B as viewed in FIGURE 2 to permit continued movement of the base portion 76 through the aperture 88 and the aligned groove 92 and then continuing to turn the spring 18 toward the full line position of FIGURE 2 while inserting leg 72 into and feeding it through the aperture 86 and groove 90 and feeding the leg 74 into and through the groove 92 and the aperture 88. With the spring 18 in this final inserted position, the longitudinally elongated portion 82 can be elastically deflected to engage its terminal end portion 84 with the notch 94 defined in the rear face of the support strip 12 between its surface 52 and the portion in which the socket 54 is formed. The leg 72 of spring 18 is sufficiently short to prevent contact of the end thereof with face 52 of strip 12 when in its FIGURE 4 position and its biasing the strip 12.

The purpose of the angular relation between the portion 78 and the leg 74 of the spring 18 is to offset the biasing leg of the spring around the mounting strip edge 46 and prevent a concentration of biasing stress upon the material of the support strip 14 adjacent aperture 88 with resultant rupture at that point of strip 14 during continued use as a result of the characteristic cold flow of the non-metallic material employed to assure a non-galling pivot connection.

If the spring 18 should ever become broken it can be readily replaced by removing the weather strip 10 from the door 20, installing a new spring 18 as above described, and re-installing the weather strip 20. This is a definite advantage over prior art weather strips of this general type which were no longer usable once this spring biasing the pivoted portion thereof became broken because of the manner of securing the spring to the mounting strip to resist the biasing forces.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A door or like closure mounted weather strip assembly comprising a longitudinally elongated rigid support strip having a cylindrical bead along one longitudinal edge and a longitudinally extending socket of non-circular cross section along its opposite edge, an equally longitudinally elongated, substantially rigid mounting strip having an open sided cylindrical socket along one edge complementary to and pivotally receiving the bead of said support strip, the edges of said mounting strip socket co-acting with the faces of said support strip on the opposite sides of the bead thereof to define the open limits of relative pivotal movement therebetween, an equally longitudinally elongated flexible sealing strip having a projecting bead extending along one edge and interfitting in the socket of said support strip in interlocking relation, said sealing strip projecting laterally from said support strip and tapering in thickness to a thin flexible edge along its opposite side, and a spring mounted upon said mounting strip and engaging said support strip to bias said support strip toward its open limit position, said mounting strip having a first face adapted for mounting in opposed relation to a door exterior face, said mounting strip being provided with a pair of apertures therein extending through said first face and intersecting the socket, said apertures being spaced longitudinally of said mounting strip, said supporting strip bead having a pair of transverse grooves alinged with said apertures, said spring being a spring wire having at one end a U-shaped terminal portion the legs of which extend through said aligned apertures and grooves to thereby prevent material relative longitudinal movement between said mounting strip and said support strip and a bridging portion which overlies said first face intermediate said apertures, said spring wire further having a first portion extending from the end of one of said legs transversely of said strips and at an angle and away from said support strip, and a second intermediate portion extending longitudinally of said strips from the end of said first intermediate portion at an angle inclined from said support strip and an elongated portion extending longitudinally of said strip at an angle thereto inclined therefrom and terminating in an end portion abutting said support strip whereby damage to said mounting strip at said apertures resulting from flexure of said spring is precluded.

2. The assembly defined in claim 1 wherein said mounting strip is formed of a substantially rigid synthetic plastic material which is slightly deformable under concentrated pressure whereby the edges of the socket thereof engaged by said support strip when said support strip is in in sealing position will deform sufficiently to form a weather tight seal therebetween.

3. The weather strip assembly defined in claim 1 wherein said first face of said mounting strip adjacent said one edge is provided with a protuberant longitudinally extending beading adapted upon mounting of said assembly upon an exterior surface of a door or like closure to abut the exterior surface of a door or like closure and maintain said one face of said mounting strip at an inclination and in spaced relation from said exterior surface and thereby define a free space for receiving the connecting base portion of said U-shaped attachment portion of said spring wire.

References Cited in the file of this patent

UNITED STATES PATENTS

| | | |
|---|---|---|
| 2,638,641 | Menzies | May 19, 1953 |
| 2,900,683 | Isbister | Aug. 25, 1959 |
| 2,924,545 | Daly | Feb. 9, 1960 |
| 2,929,116 | Isbister | Mar. 22, 1960 |
| 3,070,817 | Kohrn et al. | Jan. 1, 1963 |
| 3,091,007 | Viscolosi | May 28, 1963 |

FOREIGN PATENTS

| | | |
|---|---|---|
| 7,525 | Great Britain | Apr. 12, 1901 |
| 21,795 | Great Britain | Sept. 1912 |
| 196,727 | Great Britain | May 3, 1923 |
| 253,210 | Great Britain | June 17, 1926 |
| 268,704 | Great Britain | Apr. 7, 1927 |
| 820,333 | Great Britain | Sept. 16, 1959 |